May 10, 1960  O. E. SAARI  2,935,885
MULTIPLE SKEW-AXIS GEARING
Filed March 25, 1958  2 Sheets-Sheet 1

INVENTOR.
BY Oliver E. Saari
Olson & Trexler
attys

May 10, 1960

O. E. SAARI 2,935,885

MULTIPLE SKEW-AXIS GEARING

Filed March 25, 1958

INVENTOR.
Oliver E. Saari
BY
Olson & Trexler attys.

United States Patent Office 2,935,885
Patented May 10, 1960

2,935,885
MULTIPLE SKEW-AXIS GEARING

Oliver E. Saari, Schiller Park, Ill., assignor to Illinois Tool Works, Chicago, Ill., a corporation of Illinois Application March 25, 1958, Serial No. 723,911

5 Claims. (Cl. 74—425)

This invention is concerned with speed reduction gearing, particularly of the worm type.

In my prior U.S. Patent 2,696,125 I have disclosed a particularly effective form of skew axis reduction gearing. In accordance with the aforesaid patent, the gearing has a maximum line contact at all times, and hence is capable of transmitting heavy loads.

It is an object of the present invention to utilize gearing similar to that disclosed in my aforesaid patent wherein nearly twice the load can be transmitted by a gearing unit of only slightly greater size.

It is another object of the present invention to provide a skew axis gear reduction unit wherein radial force and torque are substantially the only forces imposed on the driven shaft, axial thrust being substantially completely eliminated.

A more specific object of the present invention is to drive a pair of generally reversed gears fixed in confronting relations on a common shaft by means of a single worm positioned intermediate the gears and meshing with both gears.

Another specific object of this invention is to drive a pair of gears on adjacent shafts in the same direction by a pair of identical coaxially mounted worms, where design conditions require both gears to be on the same side of the worm shaft, and the worms themselves (due to bearing support limitations, desired backlash adjustment means, etc.) are opposed.

Other and further objects and advantages of the present invention will be apparent from the following description when taken in connection with the accompanying drawings wherein.

Figure 1:
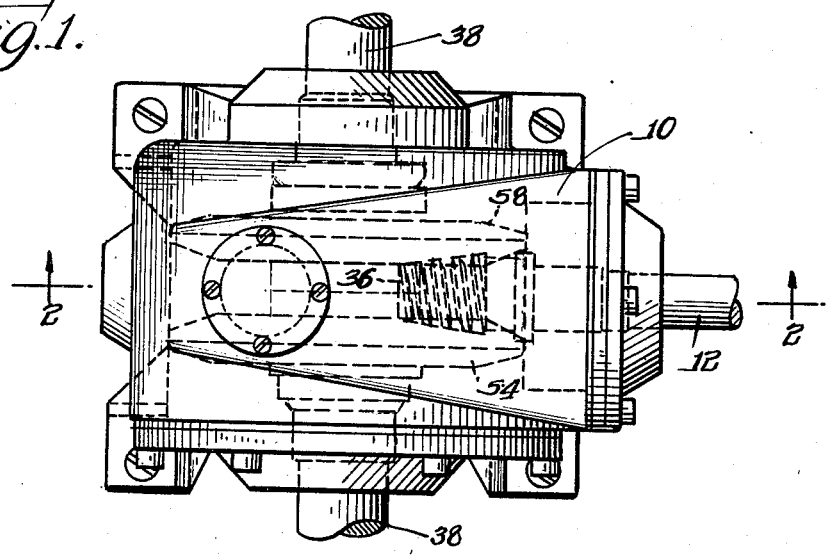
Fig. 1 is a top view of a gear unit constructed in accordance with the principles of this invention.
Figure 2:
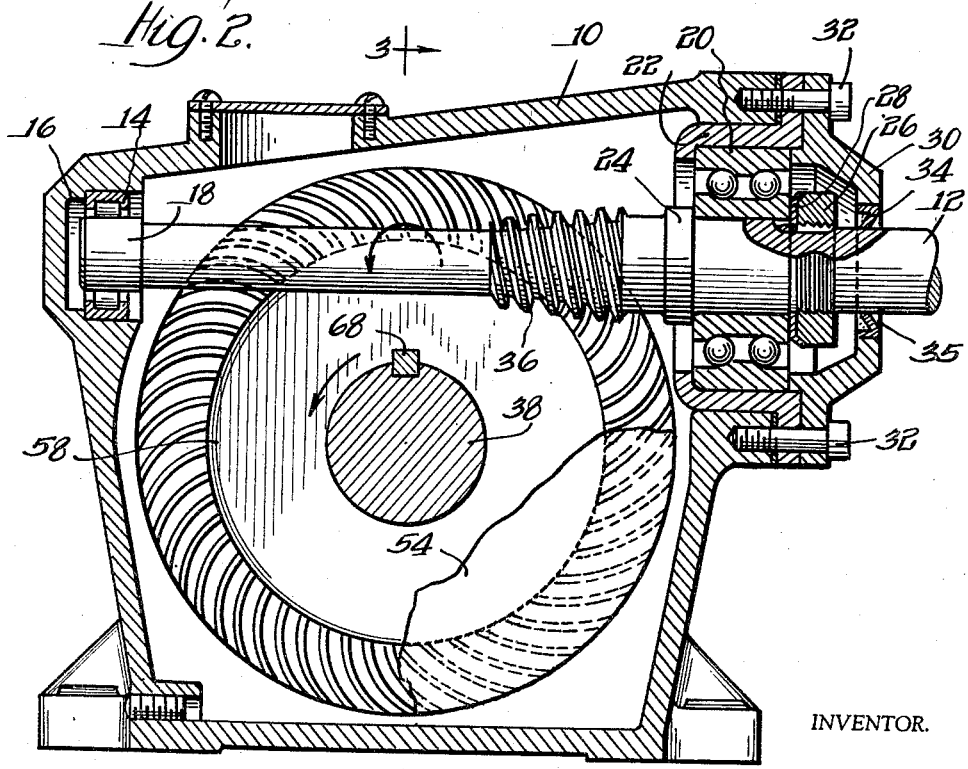
Fig. 2 is a vertical sectional view as taken along the line 2—2 in Fig. 1.
Figure 3:
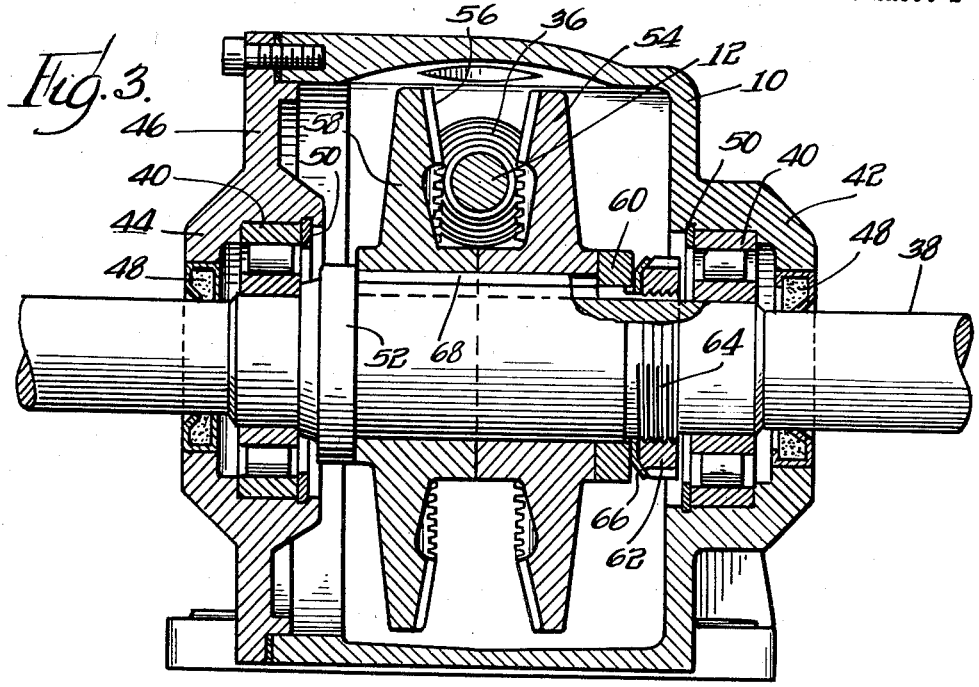
Fig. 3 is a vertical sectional view at right angles to Fig. 2 taken along the line 3—3 in Fig. 2.

Referring now in greater particularity to the drawings, and first to Figs. 1–3, there is shown a gear housing 10 into which a driving shaft 12 extends. The inner end of the driving shaft is journaled in a roller bearing 14 set in a pocket 16 in the gear housing, an enlarged end 18 on the driving shaft serving as the inner bearing race. The driving shaft 12 also is journaled in a double ball bearing 20, the outer race of which is received in a cup-shaped insert 22 in a wall of the housing 10. The inner race of the bearing 20 is positioned between a circumferential ridge 24 on the shaft 12, and a nut 26 threaded on the shaft and having a lock washer 28 interposed between the nut and the bearing race. A bearing cap 30 is secured over the nut 26 by means of bolts or cap screws 32 which also hold the insert 22 in place. A bearing seal 34 is placed in an aperture 35 of the cap through which the shaft passes.

Relatively adjacent the bearing 20, the shaft 12 has a worm or pinion 36 thereon. The worm or pinion 36 could be fixed in place, but preferably is formed integral with the shaft. The worm or pinion 36 is constructed in accordance with my aforesaid Patent 2,696,125, the disclosure of which is hereby incorporated herein by reference. An important characteristic of the pinion or worm 36 is that the thread thereon is of uniform lead, and the pinion or worm is a frustum of a cone of rectilinear taper.

A driven shaft 38 is arranged at right angles, but in skew relation to the driving shaft 12. Driven shaft 38 extends in both directions from the housing 10, and is journaled in roller bearings 40 in an enlarged boss 42 in one side of the housing and a similar boss 44 in an end plate 46 bolted on the opposite side of the housing. Seals 48 are provided for the shaft 38 in the bosses 42 and 44. The outer races of the bearings are held in place by snap rings 50, and the inner races are seated on the shaft. It is important to note that the bearings 40 are roller bearings, rather than ball bearings, as the roller bearings shown allow a slight amount of end play for axial shifting of the shaft 38 for proper matching of the pinion or worm 36 with the gears hereinafter to be set forth.

The shaft 38 is provided with an annular enlargement 52 against which a gear 58 abuts. The gear is provided with crown teeth 56 meshing with the pinion or worm 36, and a confronting gear 54 meshes with the pinion or worm on the opposite side thereof. The gear 54 abuts the gear 58, and a collar 60 is clamped thereagainst by a nut 62 threaded on the shaft at 64, and clamping a lock washer 66 against the collar 60.

In the event that the gear shaft bearings must carry an externally applied axial thrust load, then a thrust type bearing can be substituted for the present roller type bearing and the gears could be permitted to align themselves by moving, as a unit, on a spline, key, or some other slidable connection on the shaft itself.

Gear 58 is similar to the gear disclosed in my aforesaid U.S. Patent 2,696,125, and is formed by a hob similar to the worm or pinion 36. The gear 54 however, is substantially a reverse of gear 58, and is made on the back side of the hob for meshing with the opposite side of the pinion 36. In Fig. 2 a fragment of the gear 54 is shown to indicate the mirror image relationship of the two gears. Normally, it would not be expected that a pinion and hob calculated to form a gear or to cooperate with a gear on one side of the pinion would cooperate with another gear, or form another gear, respectively, on the opposite side of the pinion. It has been found that this is possible with relatively high ratios, above about 40:1.

In addition to the fact that relatively reverse gears are provided, there is a surprising fact that the single worm meshing with both gears drives both gears in the same direction. Thus, the two gears are keyed to the shaft 38 at 68, and a common key may be used for this purpose. Obviously, common bevel gears would be driven in different directions. Similarly, ordinary worm gears cannot attain this result, since two ordinary worm gears cannot be made to engage a single worm, and rotate about a common axis.

It will be apparent from an inspection of the drawings that the two gears meshing with the single worm do not require a much larger housing than would a single gear meshing with the worm. However, since there is twice as much driving contact at all times, the force which can be transmitted is substantially twice as great. Further-more, the forces on the shaft 38 are substantially radial and pure torque, since axial thrust loads are balanced out. Such balancing out is aided by the fact that the roller bearings 40 allow a certain amount of floating action that allows the gears properly to adapt to the worm or pinion when the unit is first placed in operation.

Figure 4:
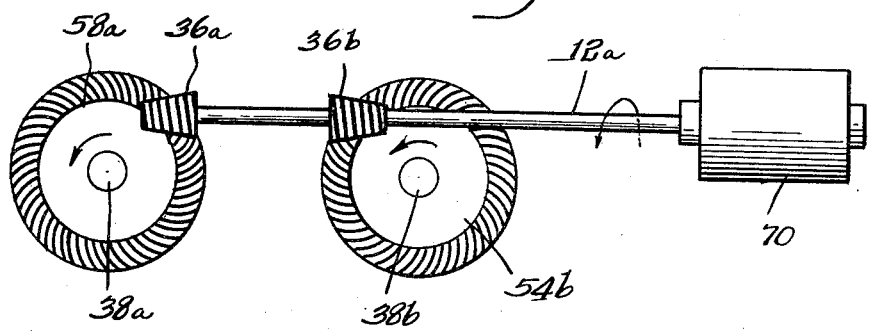
Fig. 4 is a somewhat schematic view showing a modification of the invention wherein a pair of gears is driven in the same direction and meshing on the same side of a pair of similar worms fixed to a common shaft.

Having discovered that two substantially mirror image gears can be placed on a common axis for meshing with the opposite sides of worm or pinion, with the gears driven in the same direction, it is but another step to the modification of Fig. 4, wherein one of the gears is reversed 180° on its axis, and is offset from the original axis, and is driven in the same direction by an identical worm. More specifically, the worm 36a and the worm gear 58a correspond to the worm or pinion 36 and gear 58. The gear 54b is similar to the gear 54, but it has been displaced radially, and reversed axially by 180°. The worm or pinion 36b is identical with the pinion 36a (and also the pinion 36), but it has been reversed axially 180°. The two worms or pinions 36a and 36b are mounted on a common shaft, and are driven by a motor 70, or some other suitable source of motive power, and the gears 58a and 54b are correspondingly driven in the same direction of rotation, as indicated.

In both embodiments of the invention, it is to be understood that the tooth form is different for the two gears, due to hobbing done in different quadrants of the gear blanks. The relationship is substantially that of relatively reverse gears, although not quite thin, the spiral angle of the teeth on gear 54 (see Fig. 2) is about that of the gear 58 plus approximately twice the lead angle of the worm or pinion, for the high ratios illustrated. As will be apparent the gears when mounted coaxially are necessarily rotationally offset very slightly in order to mesh properly with the threads of the worm or pinion. On the other hand, this offset can be somewhat relative. If the gears are rotationally aligned, the floating arrangement of the driven shaft allows the gears to arrange themselves somewhat differently on the opposite sides of the worm or pinion.

It is to be understood that the specific example of the invention as herein shown and described is for illustrative purposes only. Various changes in structure will no doubt encourage those skilled in the art, and are to be understood as forming a part of this invention, insofar as they fall within the spirit and scope of the appended claims.

The invention is claimed as follows:

1. A right angle skew axis reduction gearing comprising an input shaft, a tapered worm having a thread of predetermined lead angle fixed on said shaft for driving thereby, an output shaft in right angle skew axis relation to said input shaft, and a pair of relatively reversed face type worm gears fixed on said output shaft in confronting relation and having face type teeth meshing with said tapered worm on opposite sides thereof, said gears being driven in the same direction by said tapered worm, the teeth of one of said gears having a predetermined spiral angle and the teeth of the other gear having a spiral angle equal to said predetermined spiral angle plus a function of said predetermined lead angle.

2. A right angle skew axis gearing as set forth in claim 1 wherein the gears and output shaft are axially movable.

3. Gearing as set forth in claim 1 wherein the spiral angle of the teeth of the second gear is substantially the same as the spiral angle of the first gear pins twice the lead angle of the worm thread.

4. Gearing as set forth in claim 1 wherein the gear teeth of both gears are oriented in substantially the same direction with the gears in the confronting relation aforesaid.

5. A right angle skew axis reducing gearing comprising an input shaft, a tapered worm fixed on said shaft for driving thereby, an output shaft in right angle skew axis relation to said input shaft, and a pair of relatively reversed gears fixed on said output shaft and having face type teeth thereon in confronting relation with one another and meshing with said tapered worm on opposite sides thereof, the teeth of both of said gears being oriented in the same direction, said gears being driven in the same direction by said worm.

References Cited in the file of this patent

UNITED STATES PATENTS

| | | |
|---|---|---|
| 729,157 | Green | May 26, 1903 |
| 856,405 | Janson | June 11, 1907 |
| 1,416,163 | Bock | May 16, 1922 |
| 1,600,738 | Rockwell | Sept. 21, 1926 |
| 1,694,028 | Wildhaber | Dec. 4, 1928 |
| 1,751,650 | Nieman | Mar. 25, 1930 |
| 2,696,125 | Saari | Dec. 7, 1954 |